United States Patent
Gilbert

(10) Patent No.: US 8,732,061 B2
(45) Date of Patent: May 20, 2014

(54) CREATING AND TRADING DYNAMIC SECURITIES

(75) Inventors: Andrew C. Gilbert, Califon, NJ (US); Mary Ann Gilbert, legal representative, Califon, NJ (US)

(73) Assignee: BGC Partners, Inc., New York, NY (US)

( * ) Notice: Subject to any disclaimer, the term of this patent is extended or adjusted under 35 U.S.C. 154(b) by 4482 days.

(21) Appl. No.: 10/042,371

(22) Filed: Dec. 27, 2001

(65) Prior Publication Data

US 2003/0126062 A1    Jul. 3, 2003

(51) Int. Cl.
*G06Q 40/00*    (2012.01)

(52) U.S. Cl.
USPC .......................................... 705/37; 705/36 R

(58) Field of Classification Search
USPC ....................................................... 705/36, 37
See application file for complete search history.

(56) References Cited

U.S. PATENT DOCUMENTS

| | | | |
|---|---|---|---|
| 3,976,840 A | 8/1976 | Cleveland et al. | |
| 4,412,287 A | 10/1983 | Braddock, III | |
| 4,674,044 A | 6/1987 | Kalmus et al. | |
| 4,823,265 A | 4/1989 | Nelson | |
| 5,101,353 A | 3/1992 | Lupien et al. | |
| 5,126,936 A | 6/1992 | Champion et al. | |
| 5,132,899 A | 7/1992 | Fox | |
| 5,161,103 A | 11/1992 | Kosaka et al. | |
| 5,193,056 A | 3/1993 | Boes | |
| 5,214,579 A * | 5/1993 | Wolfberg et al. ........... | 705/36 R |
| 5,220,500 A | 6/1993 | Baird et al. | |
| 5,267,148 A | 11/1993 | Kosaka et al. | |
| 5,270,922 A | 12/1993 | Higgins | |
| 5,689,651 A | 11/1997 | Lozman | |
| 5,761,442 A | 6/1998 | Barr et al. | |
| 5,761,661 A | 6/1998 | Coussens et al. | |
| 5,778,357 A | 7/1998 | Kolton et al. | |
| 5,799,287 A | 8/1998 | Dembo | |
| 5,806,048 A | 9/1998 | Kiron et al. | |
| 5,884,287 A | 3/1999 | Edesess ........................ | 705/36 |
| 5,893,079 A | 4/1999 | Cwenar ........................ | 705/36 |
| 5,946,667 A | 8/1999 | Tull, Jr. et al. | |
| 5,950,176 A | 9/1999 | Keiser et al. | |
| 6,018,722 A | 1/2000 | Ray et al. | |
| 6,021,397 A | 2/2000 | Jones et al. | |

(Continued)

FOREIGN PATENT DOCUMENTS

| | | |
|---|---|---|
| JP | 2006-505027 | 2/2006 |
| JP | 2006-277597 | 10/2006 |

(Continued)

OTHER PUBLICATIONS

Collins Dictionary of Business, 1995, retrieved from xreferplus.com, defining securitization.*

(Continued)

*Primary Examiner* — Alexander Kalinowski
*Assistant Examiner* — Chuks Onyezia
(74) *Attorney, Agent, or Firm* — Glen R. Farbanish

(57) ABSTRACT

Systems and methods for creating and trading dynamic securities are provided. Dynamic securities according to the invention may preferably include any security or non-securitized investment. To form the dynamic security, a user may select a plurality of securities including stocks, bonds, baseball cards and modern art paintings to create a dynamic security. The selection may be limited to a pre-determined list of securities.

48 Claims, 3 Drawing Sheets

(56) References Cited

U.S. PATENT DOCUMENTS

| | | | |
|---|---|---|---|
| 6,088,685 | A | 7/2000 | Kiron et al. |
| 6,278,981 | B1 | 8/2001 | Dembo et al. |
| 6,484,151 | B1 | 11/2002 | O'Shaughnessy |
| 6,594,643 | B1 | 7/2003 | Freeny |
| 6,601,044 | B1 | 7/2003 | Wallman |
| 6,778,968 | B1 | 8/2004 | Gulati |
| 6,876,982 | B1 | 4/2005 | Lancaster |
| 6,947,901 | B1 | 9/2005 | McCabe et al. |
| 6,996,539 | B1 | 2/2006 | Wallman |
| 7,110,971 | B2 | 9/2006 | Wallman |
| 7,117,176 | B2 | 10/2006 | Wallman |
| 7,149,713 | B2 | 12/2006 | Bove et al. |
| 7,177,831 | B1 | 2/2007 | O'Shaughnessy et al. |
| 7,249,075 | B1 | 7/2007 | Altomare et al. |
| 7,249,080 | B1 | 7/2007 | Hoffman et al. |
| 7,337,136 | B1 | 2/2008 | Burns et al. |
| 7,356,498 | B2 | 4/2008 | Kaminsky et al. |
| 7,359,875 | B1 | 4/2008 | Millette et al. |
| 7,379,911 | B2 | 5/2008 | Lutnick |
| 7,389,261 | B1 | 6/2008 | Kumar et al. |
| 7,487,122 | B2 * | 2/2009 | Lipper, III .................. 705/36 R |
| 7,536,332 | B2 | 5/2009 | Rhee |
| 7,546,267 | B2 | 6/2009 | Wallman |
| 7,552,079 | B2 | 6/2009 | Bove et al. |
| 7,552,082 | B2 | 6/2009 | Wallman |
| 7,636,681 | B2 | 12/2009 | Margolis et al. |
| 7,640,200 | B2 | 12/2009 | Gardner et al. |
| 7,668,773 | B1 | 2/2010 | Pruitt |
| 7,685,046 | B2 | 3/2010 | Wallman |
| 7,689,494 | B2 | 3/2010 | Torre et al. |
| 7,707,093 | B2 | 4/2010 | O'Shaughnessy et al. |
| 7,739,172 | B2 | 6/2010 | Voudrie |
| 7,739,183 | B2 | 6/2010 | Voudrie |
| 7,917,424 | B2 | 3/2011 | Lutnick |
| 2001/0025264 | A1 | 9/2001 | Deaddio et al. |
| 2001/0025266 | A1 | 9/2001 | Gastineau et al. |
| 2001/0049651 | A1 | 12/2001 | Selleck |
| 2002/0026403 | A1 | 2/2002 | Tambay et al. |
| 2002/0046154 | A1 * | 4/2002 | Pritchard ........................ 705/37 |
| 2002/0099640 | A1 | 7/2002 | Lange |
| 2002/0128941 | A1 | 9/2002 | Champion et al. |
| 2002/0133447 | A1 | 9/2002 | Mastman |
| 2002/0147670 | A1 | 10/2002 | Lange |
| 2002/0161690 | A1 | 10/2002 | McCarthy et al. |
| 2003/0004851 | A2 | 1/2003 | Kiron et al. |
| 2003/0028468 | A1 | 2/2003 | Wong et al. |
| 2003/0046218 | A1 | 3/2003 | Albanese et al. |
| 2003/0069826 | A1 | 4/2003 | Guidi et al. |
| 2003/0097328 | A1 | 5/2003 | Lundberg et al. |
| 2003/0200169 | A1 | 10/2003 | Freeny |
| 2003/0220865 | A1 | 11/2003 | Lutnick |
| 2003/0233308 | A1 | 12/2003 | Lundberg et al. |
| 2004/0024677 | A1 | 2/2004 | Wallman |
| 2004/0039684 | A1 | 2/2004 | Sandor |
| 2004/0230443 | A1 | 11/2004 | McMorris et al. |
| 2004/0230512 | A1 | 11/2004 | Gulati |
| 2005/0091133 | A1 | 4/2005 | Ballman |
| 2005/0108148 | A1 | 5/2005 | Carlson |
| 2005/0273411 | A1 | 12/2005 | Voudrie |
| 2005/0283428 | A1 | 12/2005 | Bartels et al. |
| 2006/0069635 | A1 | 3/2006 | Ram et al. |
| 2006/0089851 | A1 | 4/2006 | Silby et al. |
| 2006/0184445 | A1 | 8/2006 | Sandor et al. |
| 2007/0016511 | A1 | 1/2007 | Walsh et al. |
| 2007/0033129 | A1 | 2/2007 | Coates |
| 2007/0208645 | A1 | 9/2007 | Hoffman et al. |
| 2008/0162372 | A1 | 7/2008 | Margolis et al. |
| 2008/0215478 | A1 | 9/2008 | Lutnick |
| 2008/0313099 | A1 | 12/2008 | Billings et al. |
| 2009/0276372 | A1 | 11/2009 | Wallman |
| 2010/0049667 | A1 | 2/2010 | Margolis et al. |
| 2010/0088210 | A1 | 4/2010 | Gardner et al. |
| 2011/0295735 | A1 | 12/2011 | Lutnick |
| 2013/0124379 | A1 | 5/2013 | Gilbert |
| 2013/0132300 | A1 | 5/2013 | Margolis et al. |

FOREIGN PATENT DOCUMENTS

| | | |
|---|---|---|
| JP | 2008-518360 | 5/2008 |
| WO | WO 98/49639 | 11/1998 |
| WO | WO 99/01983 | 1/1999 |
| WO | WO 00/26745 | 5/2000 |
| WO | WO 01/33316 A2 | 5/2001 |
| WO | WO 2006/049950 | 5/2006 |

OTHER PUBLICATIONS

Penguin Busines Dictionary, 1994, retrieved from xreferplus.com, defining options.*

Foster, Ian, et al. "A security architecture for computational grids." Proceedings of the 5th ACM conference on Computer and communications security. ACM, 1998.*

Biais, Bruno, et al. "Dynamic security design: Convergence to continuous time and asset pricing implications." The Review of Economic Studies 74.2 (2007): 345-390.*

Keahey, Kate, Matei Ripeanu, and Karl Doering. "Dynamic creation and management of runtime environments in the grid." Workshop on Designing and Building Web Services (to appear). 2003.*

Chen, Gong-meng, Michael Firth, and Oliver M. Rui. "The dynamic relation between stock returns, trading volume, and volatility." Financial Review 36.3 (2001): 153-174.*

Office Action for U.S. Appl. No. 09/927,628, entitled "Systems and Methods for Developing and Administering Investment Trusts," mail date Aug. 8, 2006.

Office Action for U.S. Appl. No. 09/927,628, entitled "Systems and Methods for Developing and Administering Investment Trusts," mail date May 1, 2007.

Office Action for U.S. Appl. No. 09/927,628, entitled "Systems and Methods for Developing and Administering Investment Trusts," mail date Nov. 16, 2007.

United States Department of the Treasury, Bureau of the Public Debt, at http://www.publicdebt.treas.gov, printed Aug. 25, 2004.

Actively Managed Exchange-Traded Funds, Investment Company Act Release No. 25258 (2001 SEC Lexis 2363), Nov. 8, 2001.

Merrill Lynch, Pierce, Fenner & Smith Incorporated, Sec No Action Letter (1999 SEC No-Act. Lexis 737), pub. avail. Sep. 3, 1999.

Indosuez Asset Management Asia Limited, SEC No Action Letter (1997 SEC No-Act. Lexis 326), pub. avail. Feb. 14, 1997.

Commonwealth Bank of Australia, SEC No Action Letter (1996 SEC No-Act. Lexis 865), pub. avail. Sep. 23, 1996.

Robertson, Stephens & Company, SEC No Action Letter (1993 SEC No-Act. Lexis 435), pub. avail. Mar. 13, 1993.

CRT Government Securities, Ltd., SEC No Action Letter (1992 SEC No-Act. Lexis 844), pub. avail. Aug. 4, 1992.

Bear, Stearns & Co., Inc., SEC No Action Letter (1992 SEC No-Act. Lexis 81), pub. avail. Jan. 28, 1992.

Merrill Lynch, Pierce, Fenner & Smith, Inc., SEC No Action Letter (1990 SEC No-Act. Lexis 1136), pub. avail. Sep. 26, 1990.

Financial Security Assurance Inc., SEC No Action Letter (1988 SEC No-Act. Lexis 456), pub. avail. Mar. 30, 1988.

Central Utah Rural Impact Capital Corp., SEC No Action Letter (1980 SEC No-Act. Lexis 3589), pub. avail. Aug. 29, 1980.

Standard & Poor's Depository Receipts® ("SPDRs")®, SPDR Trust, Series 1, A Unit Investment Trust, prospectus dated Apr. 25, 1996.

Jinny St. Goar, "Weaving WEBs and Baskets,"from the Internet at http://www.assetpub.com/archive/gc/96-02gcsummer/summer96GC086.html, printed on Aug. 2, 2000.

John Downes & Jordan Elliot Goodman, 1998). *Dictionary of Finance and Investment Terms*, 297-298, 301 (5th ed. 1998).

USPTO Office Action for Application No. 09/927,628, May 14, 2008 (7 pages).

USPTO Office Action for U.S. Appl. No. 09/927,628, Jul. 22, 2008 (9 pages).

USPTO Office Action for U.S. Appl. No. 10/329,103, Dec. 21, 2004 (15 pages).

USPTO Office Action for U.S. Appl. No. 10/329,103, Jun. 27, 2005 (10 pages).

USPTO Office Action for U.S. Appl. No. 10/329,103, Sep. 26, 2005 (3 pages).

(56) References Cited

OTHER PUBLICATIONS

U.S. Appl. No. 09/927,628, filed Aug. 10, 2001, Pritchard.
U.S. Appl. No. 12/119,604, filed May 13, 2008, Lutnick.
U.S. Appl. No. 10/329,103, filed Dec. 23, 2002, Lutnick.
USPTO Office Action for U.S. Appl. No. 10/329,103, Dec. 29, 2005 (13 pages).
USPTO Office Action for U.S. Appl. No. 10/329,103, Jun. 19, 2006 (14 pages).
USPTO Office Action for U.S. Appl. No. 10/329,103, Dec. 1, 2006 (14 pages).
USPTO Office Action for U.S. Appl. No. 10/329,103, Jun. 25, 2007 (8 pages).
USPTO Office Action for U.S. Appl. No. 10/329,103, Oct. 17, 2007 (3 pages).
Barron's Dictionary Finance and Investment Terms, 6th Edition, Downes and Goodman, Editors, Copyright 1985, 1987, 1991, 1995, 1998, 2003, Happauge, NY, p. 304.
Barron's Dictionary of Business Terms, 3rd Edition, Barron's Educational Series, 2000, pp. 118, 662.
John Downes et al., "Dictionary of Finance and Investment Terms," 1998, 5th Edition, pp. 380 and 689.
USPTO Examiner Interview Summary Record for U.S. Appl. No. 12/119,604, Feb. 26, 2010 (3 pages).
USPTO Notice of Allowance and Fees Due for U.S. Appl. No. 12/119,604, Jun. 11, 2010 (14 pages).
USPTO Examiner Interview Summary Record for U.S. Appl. No. 10/329,103, Oct. 3, 2007 (3 pages).
USPTO Examiner Interview Summary Record for U.S. Appl. No. 10/329,103, Nov. 14, 2007 (3 pages).
USPTO Examiner Interview Summary Record for U.S. Appl. No. 10/329,103, Jan. 31, 2008 (3 pages).
USPTO Notice of Allowance and Fees Due for U.S. Appl. No. 10/329,103, Jan. 29, 2008 (11 pages).
USPTO Petition Decision for U.S. Appl. No. 09/927,628, Aug. 30, 2010 (2 pages).
U.S. Appl. No. 60/343,885, filed Dec. 26, 2001, Lutnick.
USPTO Office Action for U.S. Appl. No. 09/927,628, Oct. 25, 2010 (11 pages).
USPTO Notice of Allowance and Fees Due for U.S. Appl. No. 12/119,604, Nov. 22, 2010 (15 pages).
International Search Report and Written Opinion for International Application No. PCT/US08/53533, dated Jul. 21, 2008 (6 pages).
USPTO Office Action for U.S. Appl. No. 11/675,294, Sep. 15, 2008 (7 pages).
USPTO Examiner Interview Summary for U.S. Appl. No. 11/675,294, Jun. 9, 2009 (2 pages).
U.S. Appl. No. 11/675,294, filed Feb. 15, 2007, Margolis et al.
U.S. Appl. No. 12/581,125, Oct. 17, 2009, Margolis et al.
U.S. Appl. No. 60/882,094, filed Dec. 27, 2006, Margolis et al.
USPTO Notice of Allowance for U.S. Appl. No. 11/675,294, Jul. 9, 2009 (15 pages).
USPTO Examiner Interview Summary for U.S. Appl. No. 11/675,294, Jul. 9, 2009 (1 page).
USPTO Examiner Interview Summary for U.S. Appl. No. 11/675,294, Aug. 20, 2009 (4 pages).
USPTO Examiner Interview Summary for U.S. Appl. No. 11/675,294, Nov. 16, 2009 (3 pages).
USPTO Response to Amendment under Rule 312 for U.S. Appl. No. 11/675,294, Nov. 19, 2009 (2 pages).
International Preliminary Report on Patentability for International Application No. PCT/US08/53533, Aug. 19, 2009 (5 pages).
Australian Examiner's Report for Application No. 2008216436, dated Jul. 30, 2010 (2 pages).
USPTO Office Action for U.S. Appl. No. 12/119,604, Nov. 24, 2008 (9 pages).
USPTO Office Action for U.S. Appl. No. 09/927,628, Feb. 27, 2009 (10 pages).
USPTO Office Action for U.S. Appl. No. 09/927,628, Dec. 21, 2009 (11 pages).
USPTO Office Action for U.S. Appl. No. 12/119,604, Aug. 31, 2009 (12 pages).
U.S. Appl. No. 60/228,142, filed Aug. 25, 2000 (5 pages).
International Search Report for International Application No. PCT/US01/25022, dated Dec. 26, 2001 (3 pages).
International Preliminary Examination Report for International Application No. PCT/US01/25022, dated Mar. 4, 2002 (3 pages).
PCT Written Opinion for International Application No. PCT/US01/25022, dated Nov. 21, 2002 (4 pages).
UK Examination Report for Application No. GB0304530.9, dated Jan. 20, 2004 (3 pages).
UK Examination Report for Application No. GB0304530.9, dated Aug. 6, 2004 (3 pages).
UK Examination Report for Application No. GB0416208.7, dated Dec. 9, 2004 (2 pages).
International Search Report for International Application No. PCT/US02/40814, dated Sep. 8, 2003 (1 page).
USPTO Office Action for U.S. Appl. No. 12/581,125, Oct. 11, 2012 (13 pages).
USPTO Pre-Brief Appeal Conference Decision for U.S. Appl. No. 12/581,125, May 28, 2013 (2 pages).
USPTO Office Action for U.S. Appl. No. 09/927,628, May 6, 2011 (12 pages).
USPTO Petition Decision for U.S. Appl. No. 12/581,125, Jun. 13, 2011 (10 pages).
USPTO Office Action for U.S. Appl. No. 09/927,628, Nov. 8 2011 (3 pages).
USPTO Pre-Brief Appeal Conference Decision for U.S. Appl. No. 09/927,628, Dec. 8, 2011 (12 pages).
Canadian Office Action for Application No. 2471556, dated Oct. 19, 2011 (5 pages).
European Communication and Supplementary Search Report for Application No. 08729486.4, dated Nov. 14, 2011 (12 pages).
USPTO Office Action for U.S. Appl. No. 13/072,878, Mar. 29, 2012 (6 pages).
USPTO Office Action and Examiner Initiated Interview Summary for U.S. Appl. No. 12/581,125, Feb. 16, 2012 (13 pages).
Canadian Office Action for Application No. 2420690, dated Nov. 15, 2011 (3 pages).
Canadian Office Action for Application No. 2678497, dated May 1, 2012 (2 pages).
Canadian Office Action for Application No. 2678497, dated Jun. 6, 2013 (8 pages).
Canadian Office Action for Application No. 2471556, dated Apr. 3, 2013 (5 pages).
USPTO Office Action for U.S. Appl. No. 13/072,878, Aug. 29, 2012 (19 pages).
USPTO Final Office Action for U.S. Appl. No. 13/072,878, Jul. 3, 2013 (34 pages).
Australian Examiner's Report for Application No. 2012202467 dated Jan. 14, 2013 (2 pages).

* cited by examiner

CREATING AND TRADING DYNAMIC SECURITIES

BACKGROUND OF THE INVENTION

In recent years, electronic trading systems have gained a widespread acceptance for trading securities. For example, electronic trading systems have been created which facilitate the trading of financial instruments such as stocks, bonds, currency, futures, or other suitable financial instruments. Other tradeable instruments also include more non-traditional commodities such as baseball cards, art pieces, and other collectibles.

Many investors rely upon mutual funds to create a diversified investment base to lower investing risk. Typically, however, investors in mutual funds have no control over the creation of the fund, or the selection of individual securities which make up the mutual fund basket of securities. Investors in mutual funds also are unable to sell the individual components of the fund.

Accordingly, it would be desirable to provide systems and methods for electronic trading whereby investors may create their own basket of securities, including both traditional securities investments as well as non-traditional securities of any sort, whether it includes commodities, securities, non-securitized items, leases, collectibles, or any other possible tradeable tangible or intangible item.

It would also be desirable that this basket of securities could be traded as a whole, or in the alternative, that its individual components can be isolated and traded separate from the basket as a whole. It would further be desirable to provide systems and methods for comparing the rate of return of the dynamic security or of its individual components to a pre-determined target rate of return, and for notifying the user if the actual rate of return deviates substantially from the target rate of return.

SUMMARY OF THE INVENTION

Therefore, it is an object of the invention to provide systems and methods for electronic trading whereby investors may create their own basket of securities, including both traditional securities investments as well as non-traditional securities of any sort, whether it includes securities—i.e., instruments that show an evidence of debt or of ownership such as a stock certificate or bond—non-securitized items—i.e., instruments or objects that do not show an evidence or debt or of ownership—leases, commodities, collectibles, real property lease or any other possible tradeable tangible or intangible item.

It is also an object of this invention that this basket of securities could be traded as a whole, or in the alternative, that its individual components can be isolated and traded separate from the basket as a whole. It would further be desirable to provide systems and methods for comparing the rate of return of the dynamic security or of its individual components to a pre-determined target rate of return, and for notifying the user if the actual rate of return deviates substantially from the target rate of return.

The present invention relates to systems and methods for creating and trading dynamic securities. A dynamic security is a basket of securities composed of two or more identifiable securities, in which the dynamic security may be traded as a whole or in which the identifiable securities included in the dynamic security may be divided from the plurality of securities and sold or traded individually.

More particularly, the present invention relates to the creation of a personalized basket of securities that may be traded electronically as a whole. In the alternative, the owner of the basket of securities may isolate individual components of the basket of securities and trade them separate from the basket as a whole. The present invention may also monitor the rate of return of the dynamic security as well as the individual components of the basket of securities, and compare them to a pre-determined target rate of return. The present invention may notify the user when individual components of the dynamic security deviate substantially from the target rate.

It is an object of this invention to provide systems and methods for creating and trading dynamic securities. In accordance with the present invention, systems and methods for creating and trading dynamic securities are provided.

A method according to the invention for creating a dynamic security includes selecting or creating a basket of securities chosen from a preferably pre-determined menu or list of securities choices. The securities listed in the menu may include traditional securities such as stocks, bonds, currencies, or futures. The menu may also include less traditional forms of securities including commodities, collectibles, or any other tradeable tangible or intangible items.

A method according to the invention for trading the dynamic security includes trading the entire basket of securities on an electronic exchange. An additional method according to the invention for trading the security includes isolating individual components of the basket of securities and trading one or more of them separate from the basket as a whole.

A method according to the invention for monitoring the security involves monitoring the rate of return of the dynamic security and of the individual components that constitute the dynamic security and comparing them to a pre-determined rate of return. When the monitored rates of return deviate substantially from a pre-determined rate of return, the system preferably notifies the user.

BRIEF DESCRIPTION OF THE DRAWINGS

Further features of the invention, its nature and various advantages will be apparent from the following detailed description of the preferred embodiments, taken in conjunction with the accompanying drawings, in which like reference characters refer to like parts throughout, and in which.

DETAILED DESCRIPTION OF THE INVENTION

Figure 1:
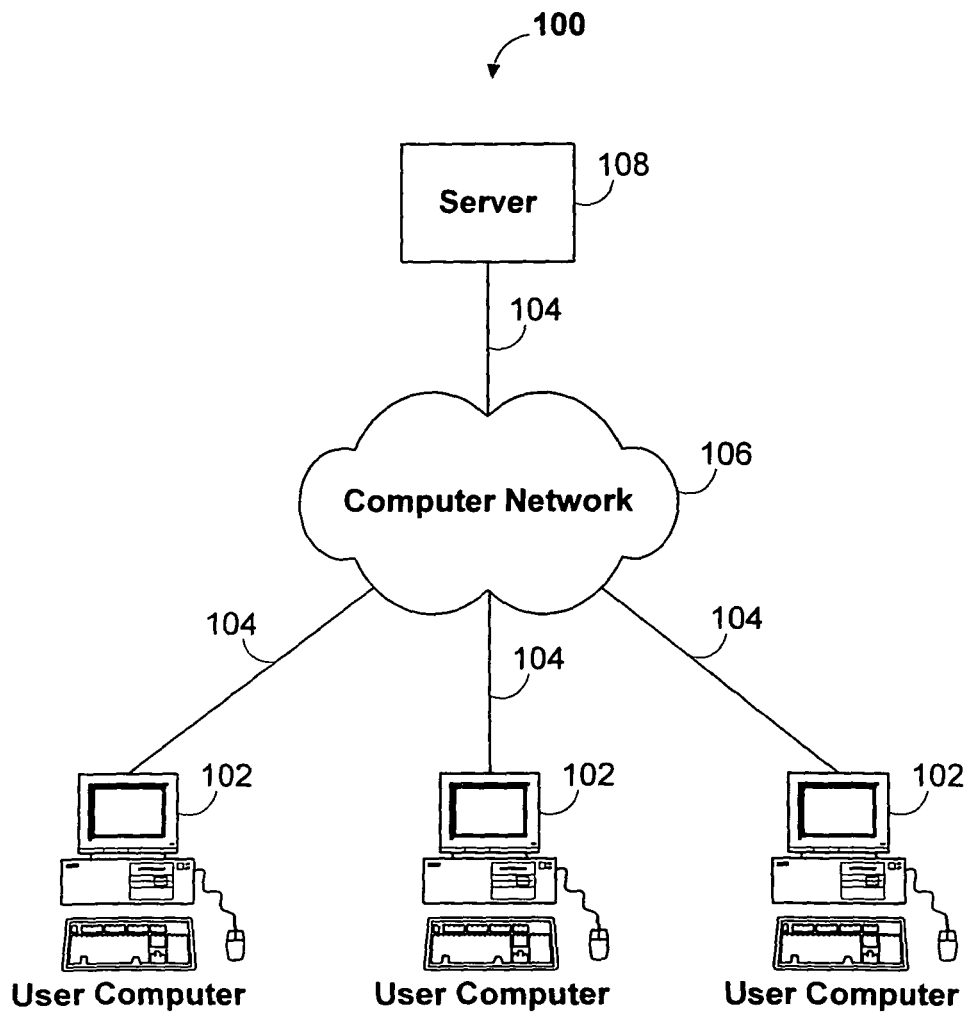
FIG. 1 is an illustration of an electronic implementation of a dynamic security system in accordance with certain embodiments of the present invention.

One example of systems and methods of creating and trading dynamic securities according to the invention is as follows. A user may select a plurality of securities including stocks, bonds, baseball cards and modern art paintings to create a dynamic security. A list of securities from which to choose may be provided to a user. When trading occurs within this predetermined list, the commissions for trading may be substantially reduced. The system may monitor the value of the dynamic security as well as the value of the individual securities of stocks, bonds, baseball cards and modern art paintings. The system may periodically compare the rate of return of the dynamic security and of the individual securities to a pre-determined rate of return. If the actual rate of return deviates from the target rate of return by more than a pre-determined percentage such that the deviation is considered to be a substantial deviation, then the system may notify the user. The extent of deviation required in order to be considered a "substantial deviation" may be configured by the user or may be pre-configured by the system. At any point, the user may trade the dynamic security as a whole, or the user may isolate or separate individual securities from the plurality of securities that constitute the dynamic security and trade these isolated securities individually.

For example, a user may select 100 shares of Stock A at a price of $10 each, 50 Bonds B at a price of $15, one rookie card of baseball player C at a price of $100, and one original modern art painting by artist D at a price of $5,000. This chosen plurality of securities constitutes the user's dynamic security. The user selects a target rate of return of 20%. The system monitors the value of the dynamic security as well as the value of the individual components of the dynamic security. If the value of the dynamic security or the value of one of the individual components deviates more than 50% (as pre-selected by the user) from the targeted rate of return, the user will be notified of the deviation.

For example, suppose baseball player C is elected to the Baseball Hall of Fame, and this causes the value of C's rookie card to double in value. The system would notify the user of the dramatic increase in value of the investment since it exceeds the pre-determined 20% target rate of return by more than the pre-selected amount of 50%. Similarly, if an influential critic disparages the recent efforts of artist D and it causes the value of the modern art painting to drop in value to $1,000, the system would notify the user of this dramatic decrease in value. In response to these developments, the user may choose to hold on to the baseball card and choose to trade the painting, or the user may pursue alternate choices.

The previous example was intended for purposes of illustration only. It should be understood, however, that the systems and methods according to the invention apply to any commodity that may be traded, including both traditional securities investments as well as non-traditional securities of any sort, whether it includes commodities, collectibles, or any other possible tradeable tangible or intangible item. It is most preferred that this system be implemented in an electronic trading platform. Nevertheless, the systems and methods of the invention do not necessarily require an electronic trading platform.

Figure 2:
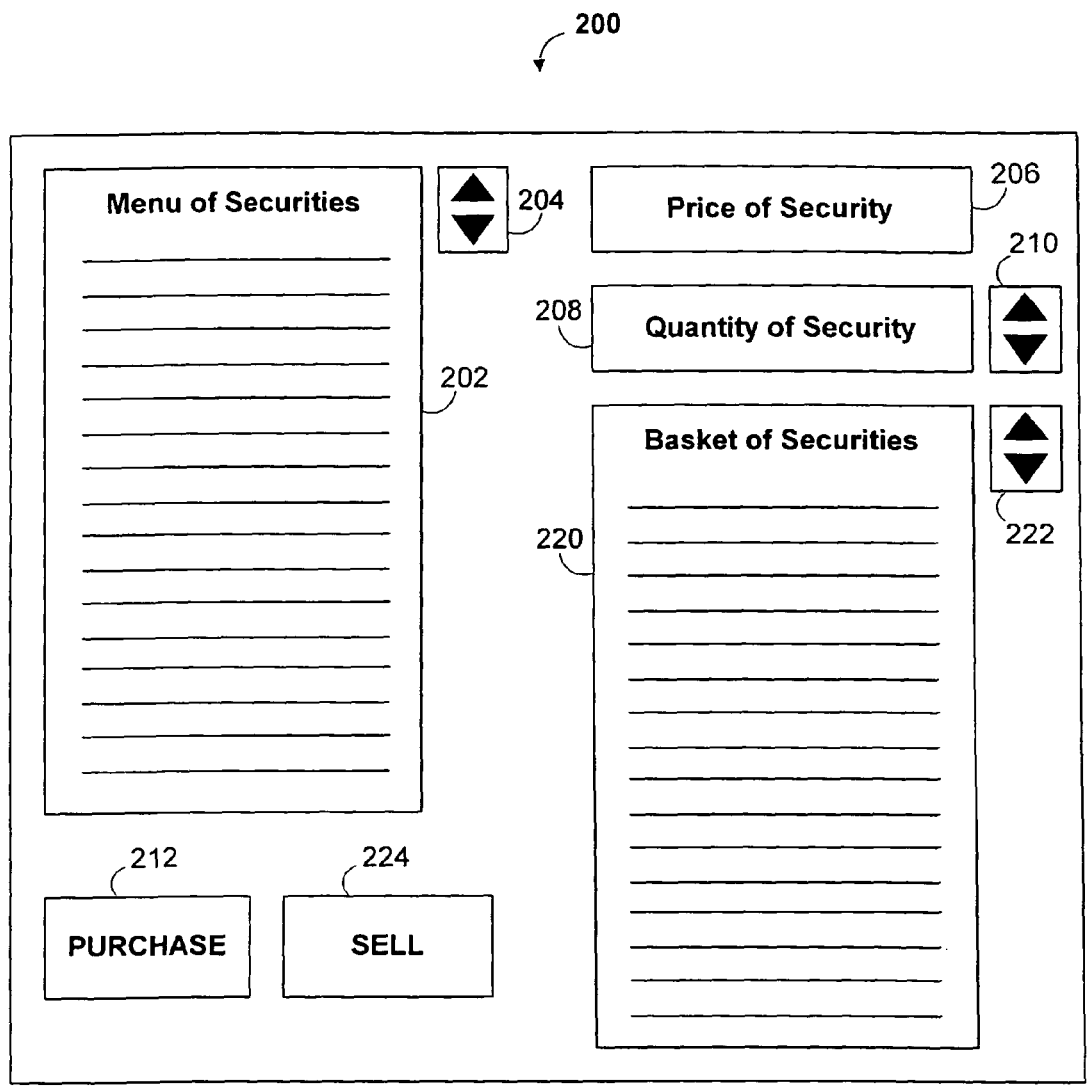
FIG. 2 is an illustration of an interface that may be presented in accordance with certain embodiments of the present invention.
Figure 3:
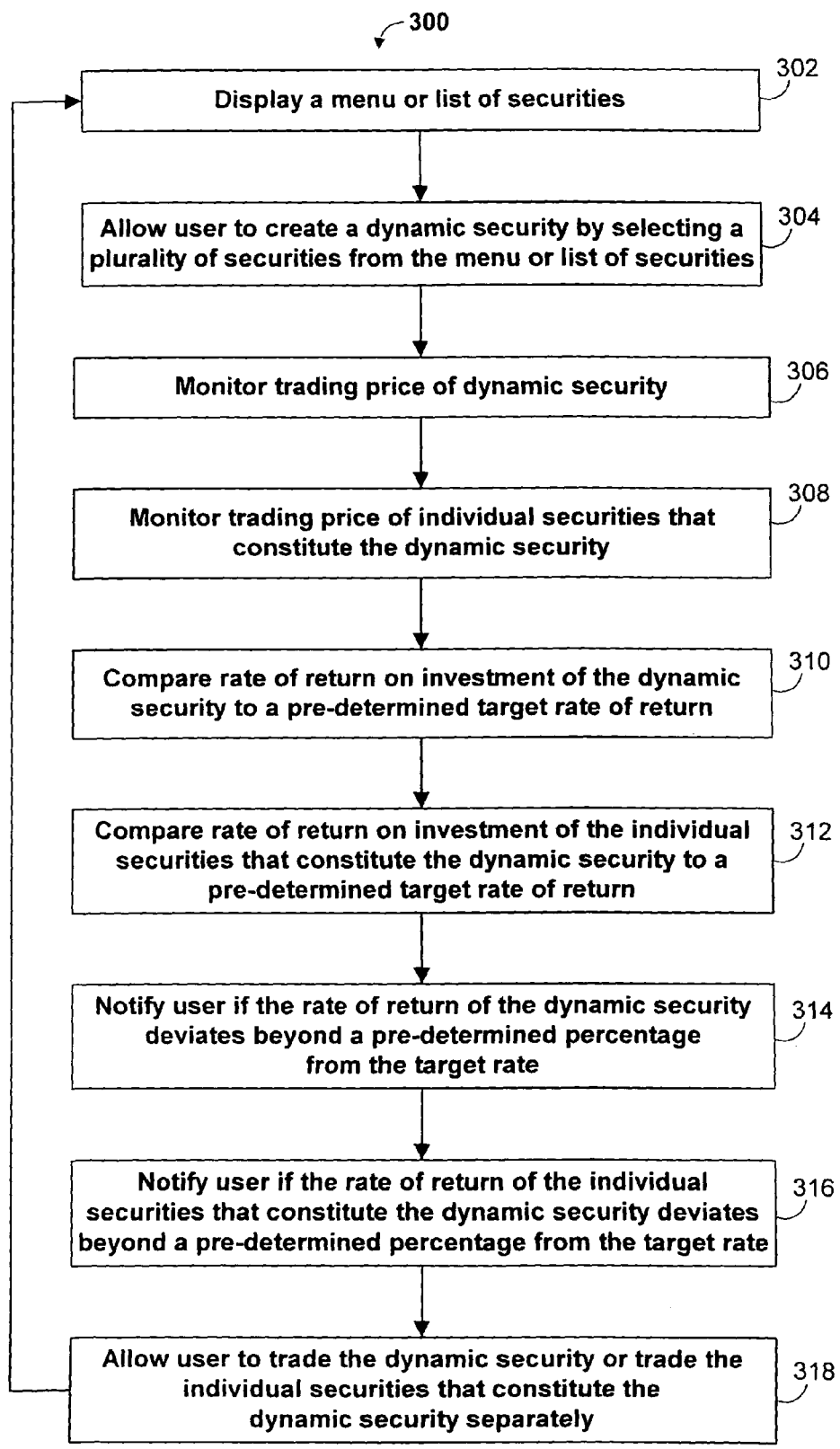
FIG. 3 is an illustration of a flow diagram for the creation and trading of a dynamic security in accordance with certain embodiments of the present invention.

The present invention is now described in more detail in conjunction with FIGS. 1-3.

FIG. 1 is an illustration of an electronic implementation of a dynamic security system in accordance with certain aspects of the present invention. As shown, system 100 may include one or more user computers 102 that may be connected by one or more communication links 104 and a computer network 106 to a trading server 108.

In system 100, user computer 102 may be a computer, processor, personal computer, laptop computer, handheld computer, personal digital assistant, computer terminal, a combination of such devices, or any other suitable data processing device. User computer 102 may have any suitable device capable of receiving user input and displaying user choices.

Communications links 104 may be optical links, wired links, wireless links, coaxial cable links, telephone line links, satellite links, lightwave links, microwave links, electromagnetic radiation links, or any other suitable communications links for communicating data between user computers 102 and trading server 108.

Computer network 106 may be the Internet, an intranet, a local area network (LAN), a wide area network (WAN), a metropolitan area network (MAN), a virtual private network (VPN), a wireless network, an optical network, an asynchronous transfer mode network (ATM), a cable network, a frame relay network, a digital subscriber line network (DSL), or any other suitable network.

Trading server 108 may be a processor, a computer, a data processing device, or any other suitable server capable of processing electronic trades of dynamic securities.

All trading interactions between user computers 102 preferably occur via computer network 106, trading server 108, and communications links 104. Traders or users at user computers 102 may conduct trading transactions using suitable input devices connected to or part of user computers 102.

FIG. 2 is an illustration of an interface that may be presented in accordance with certain aspects of the present invention. As shown, interface 200 may include a menu of securities 202, up and down arrows 204, price of security field 206, quantity of security field 208, up and down arrows 210, purchase button 212, basket of securities 220, up and down arrows 222, and sell button 224.

In order to create a dynamic security using interface 200, the user preferably first selects two or more different securities from a menu of securities 202. Up and down arrows 204 are used to scroll through the menu of securities. As the user scrolls through the menu, individual securities will be highlighted one at a time. The price of each highlighted security is displayed in field 206. The user chooses the quantity to be purchased of the highlighted security in field 208, said quantity which can be increased or decreased through the use of up and down arrows 210. Once the desired security and quantity thereof have been specified, the user may submit the purchase order by pressing purchase button 212. Once the purchase has been completed, the security will appear in the basket of securities 220. Basket of securities 220 shows the contents of the dynamic security.

In order to trade the dynamic security, the user can sell the entire basket of securities 220 by highlighting the entire collection of securities in field 220 and pressing sell button 224. Alternatively, the user can sell individual securities by selecting individual securities from field 220 through the use of the up and down arrows 222. Once the desired individual security has been selected from field 220, the user may complete the sale by pressing sell button 224.

FIG. 3 is an illustration of a flow diagram for the creation and trading of a dynamic security in accordance with certain aspects of the present invention. As shown, a system and methods of creating and trading dynamic securities 300 may include displaying a menu or list of securities 302, and allowing the user to create a dynamic security by selecting a plurality of securities from the menu or list of securities 304. This preferably pre-selected list may be pre-selected so as to allow securities providers to offer their securities as part of a dynamic security for reduced or otherwise altered commissions.

The system and methods 300 may monitor the trading price of the dynamic security 306 or monitor the trading price of individual securities that are included in the dynamic security 308. Step 310 involves comparing the rate of return on investment of the dynamic security to a pre-determined target rate of return. Such comparison allows the user to evaluate the growth of the dynamic security and to compare its progress toward a target return. Step 312 performs a similar comparison on the individual securities that constitute the dynamic security. The user is notified in Step 314 and Step 316 when securities deviate substantially from the pre-determined target rate. Such notification may occur when the value of the security rises considerably, which may prompt the user to sell at a great profit or pursue some other course of action. Such notification may also occur when a security stagnates for a considerable time or when it decreases substantially in value, which may prompt the user to sell the security or pursue some other course of action. In either case, the volatile security of interest is brought to the attention of the user.

If the user decides to sell a security, Step 318 allows the user to trade either the entire dynamic security or else to trade the individual securities that constitute the dynamic security. At any time, the user may return to the beginning 302 and add securities to the basket of securities.

In one preferable embodiment of the invention, a dynamic security may be referred to by alpha-numeric indicators. These indicators may correspond to individual securities. For example, a security may be designated $100\alpha\beta32$ wherein the $100\alpha$ corresponds to 100 shares of IBM stock, the $\beta$ corresponds to 1 Henry Aaron rookie baseball card and the 32 corresponds to 32 '07 United States Treasury Bonds. The security is identified as $100\alpha\beta32$ and that is how it is traded. Alternatively, the security $100\alpha\beta32$ can be broken down into component parts and traded separately—e.g., $100\alpha$, $\beta$, 32 or in some other suitable combination. The total number of different securities in a dynamic security may be user-configured or may be pre-set by the security provider to be limited to a particular number.

Accordingly, systems and methods for creating and trading dynamic securities are provided. It will be understood that the foregoing is merely illustrative of the principles of the invention and that various modifications can be made by those skilled in the art without departing from the scope and spirit of the invention, with is limited only by the claims that follow.

What is claimed is:

1. A method comprising the steps of:
    displaying a plurality of assets to a user via a first computing device;
    receiving from the user via the first computing device at least two selected assets from the plurality of assets, wherein at least a first and a second of the selected assets are different assets;
    purchasing the selected assets to form a dynamic security, wherein the user may trade the dynamic security as a whole, and/or may divide at least one asset from the dynamic security and trade the divided asset separately from the dynamic security;
    a second computing device:
        comparing a rate of return of at least one of the assets within the dynamic security to a pre-determined target rate of return;
        determining that the rate of return of the at least one asset deviates from the pre-determined target rate of return by at least a pre-determined amount; and
        based at least in part on determining that the rate of return of the at least one asset deviates from the pre-determined target rate of return by at least the pre-determined amount, providing to the user via the first computing device a notification of the deviation.

2. The method of claim 1 wherein the plurality of assets are from one or more categories including:
    fixed income securities,
    stocks,
    futures contracts,
    options contracts,
    commodities,
    currencies,
    other securities,
    non-security financial instruments,
    real property leases,
    leases, and
    collectibles.

3. The method of claim 1, further comprising the step of monitoring a rate of return of each of the assets within the dynamic security.

4. The method of claim 3, further comprising the step of comparing the rate of return of each of the assets within the dynamic security to the pre-determined target rate of return.

5. The method of claim 4, further comprising the step of:
    for each of the assets within the dynamic security for which the respective rate of return deviates from the pre-determined target rate of return by at least the pre-determined amount, providing to the user via the first computing device a notification of the respective deviation.

6. The method of claim 1, wherein the user specifies the pre-determined amount.

7. The method of claim 6, wherein the user specifies the pre-determined target rate of return.

8. The method of claim 1, further comprising the step of displaying to the user via the first computing device a purchase price for at least one of the plurality of assets.

9. The method of claim 1, further comprising the step of receiving from the user for at least one of the selected assets a quantity of the at least one selected asset to be purchased.

10. The method of claim 1, further comprising the step of:
    based at least in part on purchasing the selected assets, displaying the purchased assets to the user via the first computing device, wherein the purchased assets are displayed to the user so as to show that the purchased assets are part of the dynamic security.

11. The method of claim 1, wherein determining that the rate of return of the at least one asset deviates from the pre-determined target rate of return by at least the pre-determined amount comprises determining that the rate of return of the at least one asset exceeds the pre-determined target rate of return by at least the pre-determined amount.

12. The method of claim 11, wherein providing to the user the notification of the deviation comprises providing to the user a notification of an increase in value of the at least one asset.

13. The method of claim 1, wherein determining that the rate of return of the at least one asset deviates from the pre-determined target rate of return by at least the pre-determined amount comprises determining that the pre-determined target rate of return exceeds the rate of return of the at least one asset by at least the pre-determined amount.

14. The method of claim 13, wherein providing to the user the notification of the deviation comprises providing to the user a notification of a decrease in value of the at least one asset.

15. The method of claim 1, wherein determining that the rate of return of the at least one asset deviates from the pre-determined target rate of return by at least the pre-determined amount comprises at least one of:
    determining that the rate of return of the at least one asset exceeds the pre-determined target rate of return by at least the pre-determined amount; and
    determining that the pre-determined target rate of return exceeds the rate of return of the at least one asset by at least the pre-determined amount.

16. The method of claim 15, further comprising the steps of:
    after providing to the user the notification, receiving from the user an indication to sell the at least one asset; and
    based at least in part on receiving the indication, trading the at least one asset without trading the other assets within the dynamic security.

17. The method of claim 16, further comprising the steps of:
    after trading the at least one asset, receiving from the user via the first computing device another selected asset from the plurality of assets; and
    purchasing the another selected asset such that the another selected asset becomes part of the dynamic security.

18. The method of claim 15, further comprising the steps of:
    after providing to the user the notification, receiving from the user an indication to sell the dynamic security; and
    based at least in part on receiving the indication, trading the dynamic security.

19. The method of claim 1, further comprising the steps of:
    comparing a rate of return of the dynamic security to the pre-determined target rate of return;
    determining that the rate of return of the dynamic security deviates from the pre-determined target rate of return by at least the pre-determined amount; and
    based at least in part on determining that the rate of return of the dynamic security deviates from the pre-determined target rate of return by at least the pre-determined amount, providing to the user via the first computing device a notification of the deviation of the dynamic security.

20. An apparatus comprising:
    at least one processor; and
    a memory, in which the memory stores instructions which, when executed by the at least one processor, make the at least one processor operable to:
    display a plurality of assets to a user via a first computing device;
    receive from the user via the first computing device at least two selected assets from the plurality of assets, wherein at least a first and a second of the selected assets are different assets;
    purchase the selected assets to form a dynamic security, wherein the user may trade the dynamic security as a whole, and/or may divide at least one asset from the dynamic security and trade the divided asset separately from the dynamic security;
    compare a rate of return of the dynamic security to a pre-determined target rate of return;
    determine that the rate of return of the dynamic security deviates from the pre-determined target rate of return by at least a pre-determined amount; and
    based at least in part on determining that the rate of return of the dynamic security deviates from the pre-determined target rate of return by at least the pre-determined amount, provide to the user via the first computing device a notification of the deviation.

21. The system apparatus of claim 20, wherein the instructions, when executed by the at least one processor, further make the at least one processor operable to monitor a rate of return of each of the assets within the dynamic security.

22. The apparatus of claim 21, wherein the instructions, when executed by the at least one processor, further make the at least one processor operable to compare the rate of return of each of the assets within the dynamic security to the pre-determined target rate of return.

23. The system of claim 22, wherein the instructions, when executed by the at least one processor, further make the at least one processor operable to:
    for each of the assets within the dynamic security for which the respective rate of return deviates from the pre-determined target rate of return by at least the pre-determined amount, provide to the user via the first computing device a notification of the respective deviation.

24. The apparatus of claim 20, wherein the instructions, when executed by the at least one processor, further make the at least one processor operable to:
    based at least in part on purchasing the selected assets, display the purchased assets to the user via the first computing device, wherein the purchased assets are displayed to the user so as to show that the purchased assets are part of the dynamic security.

25. The apparatus of claim 20, wherein to determine that the rate of return of the dynamic security deviates from the pre-determined target rate of return by at least the pre-determined amount comprises to determine that the rate of return of the dynamic security exceeds the pre-determined target rate of return by at least the pre-determined amount.

26. The apparatus of claim 20, wherein to determine that the rate of return of the dynamic security deviates from the pre-determined target rate of return by at least the pre-determined amount comprises to determine that the pre-determined target rate of return exceeds the rate of return of the dynamic security by at least the pre-determined amount.

27. The apparatus of claim 20, wherein to determine that the rate of return of the dynamic security deviates from the pre-determined target rate of return by at least the pre-determined amount comprises at least one of:
    to determine that the rate of return of the dynamic security exceeds the pre-determined target rate of return by at least the pre-determined amount; and
    to determine that the pre-determined target rate of return exceeds the rate of return of the dynamic security by at least the pre-determined amount.

28. The apparatus of claim 27, wherein the instructions, when executed by the at least one processor, further make the at least one processor operable to:
    after providing to the user the notification, receive from the user an indication to sell the dynamic security; and
    based at least in part on receiving the indication, trade the dynamic security.

29. The apparatus of claim 27, wherein the instructions, when executed by the at least one processor, further make the at least one processor operable to:
    after providing to the user the notification, receive from the user an indication to sell at least one of the assets within the dynamic security; and
    based at least in part on receiving the indication, trade the at least one asset.

30. An apparatus comprising:
    at least one processor; and
    a memory, in which the memory stores instructions which, when executed by the at least one processor, make the at least one processor operable to:
    display a plurality of assets to a user via a first computing device;
    receive from the user via the first computing device at least two selected assets from the plurality of assets, wherein at least a first and a second of the selected assets are different assets;
    purchase the selected assets to form a dynamic security, wherein the user may trade the dynamic security as a whole, and/or may divide at least one asset from the dynamic security and trade the divided asset separately from the dynamic security;

compare a rate of return of at least one of the assets within the dynamic security to a pre-determined target rate of return;

determine that the rate of return of the at least one asset deviates from the pre-determined target rate of return by at least a pre-determined amount; and based at least in part on determining that the rate of return of the at least one asset deviates from the pre-determined target rate of return by at least the pre-determined amount, provide to the user via the first computing device a notification of the deviation.

31. The apparatus of claim 30,
wherein the plurality of assets are from one or more categories including:
fixed income securities,
stocks,
futures contracts,
options contracts,
commodities,
currencies,
other securities,
non-security financial instruments,
real property leases,
leases, and
collectibles.

32. The apparatus of claim 30, wherein the instructions, when executed by the at least one processor, further make the at least one processor operable to monitor a rate of return of each of the assets within the dynamic security.

33. The apparatus of claim 32, wherein the instructions, when executed by the at least one processor, further make the at least one processor operable to compare the rate of return of each of the assets within the dynamic security to the pre-determined target rate of return.

34. The apparatus of claim 33, wherein the instructions, when executed by the at least one processor, further make the at least one processor operable to:
for each of the assets within the dynamic security for which the respective rate of return deviates from the pre-determined target rate of return by at least the pre-determined amount, provide to the user via the first computing device a notification of the respective deviation.

35. The apparatus of claim 30, wherein the user specifies the pre-determined amount.

36. The apparatus of claim 35, wherein the user specifies the pre-determined target rate of return.

37. The apparatus of claim 30, wherein the instructions, when executed by the at least one processor, further make the at least one processor operable to display to the user via the first computing device a purchase price for at least one of the plurality of assets.

38. The apparatus of claim 30, wherein the instructions, when executed by the at least one processor, further make the at least one processor operable to receive from the user for at least one of the selected assets a quantity of the at least one selected asset to be purchased.

39. The apparatus of claim 30, wherein the instructions, when executed by the at least one processor, further make the at least one processor operable to:
based at least in part on purchasing the selected assets, display the purchased assets to the user via the first computing device, wherein the purchased assets are displayed to the user so as to show that the purchased assets are part of the dynamic security.

40. The apparatus of claim 30, wherein to determine that the rate of return of the at least one asset deviates from the pre-determined target rate of return by at least the pre-determined amount comprises to determine that the rate of return of the at least one asset exceeds the pre-determined target rate of return by at least the pre-determined amount.

41. The apparatus of claim 40, wherein to provide to the user the notification of the deviation comprises to provide to the user a notification of an increase in value of the at least one asset.

42. The apparatus of claim 30, wherein to determine that the rate of return of the at least one asset deviates from the pre-determined target rate of return by at least the pre-determined amount comprises to determine that the pre-determined target rate of return exceeds the rate of return of the at least one asset by at least the pre-determined amount.

43. The apparatus of claim 42, wherein to provide to the user the notification of the deviation comprises to provide to the user a notification of a decrease in value of the at least one asset.

44. The apparatus of claim 30, wherein to determine that the rate of return of the at least one asset deviates from the pre-determined target rate of return by at least the pre-determined amount comprises at least one of:
to determine that the rate of return of the at least one asset exceeds the pre-determined target rate of return by at least the pre-determined amount; and
to determine that the pre-determined target rate of return exceeds the rate of return of the at least one asset by at least the pre-determined amount.

45. The apparatus of claim 44, wherein the instructions, when executed by the at least one processor, further make the at least one processor operable to:
after providing to the user the notification, receive from the user an indication to sell the dynamic security; and
based at least in part on receiving the indication, trade the dynamic security.

46. The apparatus of claim 44, wherein the instructions, when executed by the at least one processor, further make the at least one processor operable to:
after providing to the user the notification, receive from the user an indication to sell the at least one asset; and
based at least in part on receiving the indication, trade the at least one asset without trading the other assets within the dynamic security.

47. The apparatus of claim 46, wherein the instructions, when executed by the at least one processor, further make the at least one processor operable to:
after trading the at least one asset, receive from the user via the first computing device another selected asset from the plurality of assets; and
purchase the another selected asset such that the another selected asset becomes part of the dynamic security.

48. The apparatus of claim 30, wherein the instructions, when executed by the at least one processor, further make the at least one processor operable to:
compare a rate of return of the dynamic security to the pre-determined target rate of return;
determine that the rate of return of the dynamic security deviates from the pre-determined target rate of return by at least the pre-determined amount; and
based at least in part on determining that the rate of return of the dynamic security deviates from the pre-determined target rate of return by at least the pre-determined amount, provide to the user via the first computing device a notification of the deviation of the dynamic security.

* * * * *